G. W. Marble,
Saw.
No. 105,469. Patented July 19, 1870.
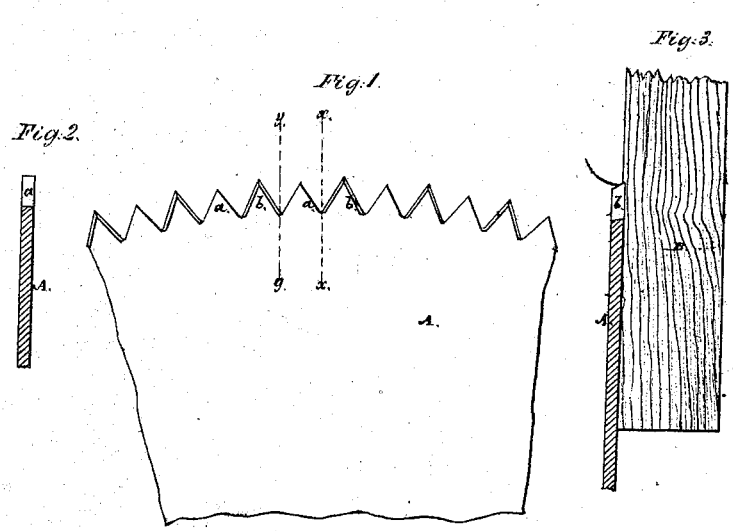
Witnesses:
Fred Haynes
B. W. Coombs
George W. Marble
per Bruce Coombs & Co.
Attorneys.

United States Patent Office.

GEORGE W. MARBLE, OF CHARLESTOWN, NEW HAMPSHIRE, ASSIGNOR TO HIMSELF AND CHARLES WAY, OF SAME PLACE.

Letters Patent No. 105,469, dated July 19, 1870.

IMPROVEMENT IN SAW FOR MAKING STUFFING FOR UPHOLSTERING.

The Schedule referred to in these Letters Patent and making part of the same

*To all whom it may concern:*

Be it known that I, GEORGE W. MARBLE, of Charlestown, in the county of Sullivan and State of New Hampshire, have invented or discovered a new and useful Stuffing; and I do hereby declare that the following is a full, clear, and exact description of the same, reference being had to the accompanying drawing forming part of this specification, and in which—

Figure 1 represents a side view of a saw, in part, used in the manufacture of my improved stuffing;

Figure 2, a section of the same, taken as indicated by the line $x\,x$, in fig. 1, and Figure 3, a similar section, taken as denoted by the line $y\,y$, and as in operation on a board for making the stuffing.

Similar letters of reference indicate corresponding parts.

My invention consists in a saw of peculiar dress, so that the same, in its action, cuts off from the side of a board, not enough to make a veneer, and too much to make dust; the product, which is of a foraminated character, and entirely different to a stuffing made from wood cut by a plane into mere curls, and is superior to the latter in many respects as a filling for upholstery.

In the accompanying drawing is represented a section or portion of a circular saw, dressed to make the improved stuffing, and which means, I find, produces a very perfect article.

This saw A differs from an ordinary circular saw in several important particulars. Thus, its teeth $a\,b$ are not hooked, but straight on their cutting-edges, as well as on their sides, the same being of triangular form, and each alternate tooth $a$ filed straight and shorter than its next succeeding tooth $b$, which latter teeth, $b$, are filed beveling on their edges, from the one and same side of the saw, throughout the whole series of them; and, when the saw is applied to the side of a board, B, as represented in fig. 3, the beveling edges of these teeth $b$ occupy an outside position, causing the longest sides of said teeth to lie next to the wood.

A saw thus dressed and applied to a board produces a cut which is insufficient to make a veneer, and too much to form dust, but makes a peforated or foraminated slice, that constitutes a very superior and entirely new article of wood stuffing.

What is here claimed, and desired to be secured by Letters Patent, is—

1. The circular saw A, having straight teeth $a\,b$, of unequal length, and the longer ones $b$ made beveling on their edges, while the shorter ones $a$ are filed or dressed straight, essentially as described and for the purpose herein set forth.

2. A wood stuffing, produced by sawing up a board into a series of foraminated slices or cuts, by means of a saw dressed substantially as specified, as a new article of commerce.

GEORGE W. MARBLE.

Witnesses:
GEORGE OLCOTT,
CHARLES C. KIMBALL.